(12) United States Patent
Schmitz (10) Patent No.: US 12,109,940 B2
(45) Date of Patent: Oct. 8, 2024

(54) DEVICE FOR ILLUMINATING A CAB OF A UTILITY VEHICLE

(71) Applicant: MAN Truck & Bus SE, Munich (DE)

(72) Inventor: Andreas Schmitz, Munich (DE)

(73) Assignee: MAN Truck & Bus SE, Munich (DE)

( * ) Notice: Subject to any disclaimer, the term of this patent is extended or adjusted under 35 U.S.C. 154(b) by 123 days.

(21) Appl. No.: 17/618,844

(22) PCT Filed: Jun. 4, 2020

(86) PCT No.: PCT/EP2020/065437
§ 371 (c)(1),
(2) Date: Oct. 11, 2022

(87) PCT Pub. No.: WO2020/249451
PCT Pub. Date: Dec. 17, 2020

(65) Prior Publication Data
US 2023/0202387 A1    Jun. 29, 2023

(30) Foreign Application Priority Data
Jun. 13, 2019 (DE) .................. 10 2019 004 186.0

(51) Int. Cl.
*B60Q 3/208*    (2017.01)
*B60Q 3/225*    (2017.01)
(Continued)

(52) U.S. Cl.
CPC ............ *B60Q 3/208* (2017.02); *B60Q 3/225* (2017.02); *B60Q 3/30* (2017.02); *B60R 7/04* (2013.01);
(Continued)

(58) Field of Classification Search
CPC .......... B60Q 3/208; B60Q 3/225; B60Q 3/30; B60Q 3/43; B60R 7/04; B60R 2011/0028;
(Continued)

(56) References Cited

U.S. PATENT DOCUMENTS

| 5,775,796 | A | 7/1998 | Weber |
| 2005/0047118 | A1* | 3/2005 | Spahr .................. F21V 21/0832 362/109 |
| 2007/0189027 | A1 | 8/2007 | Sakakibara |

FOREIGN PATENT DOCUMENTS

| CN | 109153422 A | 1/2019 |
| DE | 8322763 U1 | 12/1983 |

(Continued)

OTHER PUBLICATIONS

English Translation, FR 2550152, Feb. 8, 1985, Betz et al (Year: 1985).*

(Continued)

*Primary Examiner* — Peggy A Neils
(74) *Attorney, Agent, or Firm* — Weber Rosselli & Cannon LLP (57) ABSTRACT

The invention relates to a device for illuminating a cab of a utility vehicle, preferably a truck. The device has a roof region (10) and a storage compartment device (12), which is arranged in the roof region (10) and can be closed at least partially by means of a door element (22, 24). The device has an illumination element (38, 40), which is arranged on a roof liner (34) of the roof region (10) such that, by means of the illumination element (38, 40), a cab interior and an interior of the storage compartment device (12) behind the door element (22, 24) can be illuminated when the door element (22, 24) is completely open. The device thus provides function integration since the illumination element (38, 40)

(Continued)

is used not only to illuminate the cab interior but also to illuminate the storage compartment device (12) or the luggage rack.

21 Claims, 4 Drawing Sheets

(51) Int. Cl.
  *B60Q 3/30* (2017.01)
  *B60R 7/04* (2006.01)
  *B60R 11/00* (2006.01)
  *F21V 23/04* (2006.01)

(52) U.S. Cl.
  CPC ....... *B60R 2011/0028* (2013.01); *F21V 23/04* (2013.01)

(58) Field of Classification Search
  CPC ......... B60D 25/06; B60D 33/06; F21V 23/04; F21W 2106/00
  See application file for complete search history.

(56) References Cited

FOREIGN PATENT DOCUMENTS

| DE | 4025862 | A1 | 2/1992 | |
| --- | --- | --- | --- | --- |
| DE | 4025862 | C2 | 8/1994 | |
| DE | 19745275 | A1 | 4/1999 | |
| DE | 19734624 | C2 | 6/2000 | |
| DE | 10334552 | A1 | 2/2005 | |
| DE | 102006009481 | A1 | 9/2007 | |
| DE | 102013020313 | A1 | 6/2015 | |
| EP | 1336552 | A2 | 8/2003 | |
| FR | 2550152 | * | 2/1985 | ............. B62D 33/06 |
| KR | 20060089269 | A | 8/2006 | |
| RU | 2208532 | C1 | 7/2003 | |
| SE | 7704678 | | 10/1977 | |

OTHER PUBLICATIONS

English Translation, KR 20060089269, Jin Hee Kim, Aug. 9, 2006 (Year: 2006).*
German Office Action issued in German Patent application No. 102019004186.0 dated Feb. 18, 2020. No English translation available.
PCT Search Report and Written Opinion issued in PCT/EP2020/065437 dated Sep. 21, 2020, with English Translation of Search Report, 20 pages.
Communication according to Rule 94(3) EPO issued in European Patent Application No. 20732144.9 dated Mar. 24, 2023, with English google translation.
Decision to Grant issued in related Russian Patent Application No. 2021127647.11 dated Jan. 22, 2024 with English translation (google translate).
First Office Action issued in Chinese Patent Application No. 202080043407.6 dated Feb. 22, 2024 with English translation.

\* cited by examiner

DEVICE FOR ILLUMINATING A CAB OF A UTILITY VEHICLE

CROSS-REFERENCE TO RELATED APPLICATIONS

This application is a 371 application of PCT/EP2020/065437 filed Jun. 4, 2020, which claims benefit of and priority to German Patent Application Serial No. DE102019004186.0 filed Jun. 13, 2019, the disclosures of the above-identified applications are hereby incorporated by reference in their entirety.

The present disclosure relates to a device for illuminating a cab of a utility vehicle, preferably a lorry, having a roof region, a storage compartment device and an illumination element.

Lorry cabs are often supplied with elevated roofs. In this design, the cabs then also contain an additional storage space, also known as a luggage rack, above the windscreen. This storage space is usually closed by covers or doors. There are also variants with shutters for this purpose.

The storage space is typically not illuminated when the doors or shutters are closed. Interior illumination of the storage space is only switched on via a contact after it has been opened.

A lighting body for the interior illumination of lorry cabs is known from DE 197 34 624 C2. The lighting body has a room light and a reading light which are arranged above one another, wherein the room light is arranged at the top and the reading light is arranged at the bottom. The lighting body is designed to be sufficiently stable so that, in the installed position, it has a supporting function for a luggage rack arranged in the front roof region of the cab.

The present disclosure is based on the object of creating an alternative and/or improved device for illuminating a cab of a utility vehicle.

The object is achieved by the features of the independent claim. Advantageous developments are indicated in the dependent claims and the description.

The present disclosure creates a device for illuminating a cab of a utility vehicle, preferably a lorry. The device has a roof region. The device has a storage compartment device (e.g. having two outer and a middle storage compartment), which is arranged in the roof region and can be closed at least partially by means of a door element. The device has an illumination element, which is arranged (e.g. positioned and/or aligned) on a roof liner of the roof region such that, by means of the illumination element (e.g. without adjusting the illumination element), a cab interior and an interior of the storage compartment device behind the door element can be illuminated, preferably at the same time, when the door element is completely open.

The device therefore offers an integration of functions since the illumination element serves not only to illuminate the vehicle interior but also to illuminate the storage compartment device or the luggage rack. The illumination element should be positioned, in particular, such that it is not covered by the open element. By assuming the function of illuminating the interior of the storage compartment device, the number of illumination elements installed within the storage compartment device can be reduced, for example, and/or one or more regions within the storage compartment device can be illuminated.

It is possible that the illumination element has a room lighting portion for illuminating the cab interior and the interior of the storage compartment device. The illumination element can optionally have an, e.g. coloured, ambient illumination portion.

By way of example, the illumination element can be installed in a fixed manner. The illumination element can therefore be non-movable and/or non-adjustable, for example.

In an exemplary embodiment, the storage compartment device is arranged in the front roof region and/or on the front side of the cab.

In a further exemplary embodiment, the door element can be pivoted upwards for opening purposes.

In a further exemplary embodiment, the illumination element is expediently switched on automatically when the door element is opened and/or switched off automatically when the door element is closed. This enables the storage compartment device to be illuminated automatically by the illumination element when the door element is opened.

In one embodiment, a spacing in a longitudinal roof direction between the at least one illumination element and the door element is equal to or greater than a height of the door element. Alternatively or additionally, the door element does not cover the illumination element in the open state. It can thus be prevented that the open door element shields the interior of the storage compartment device from the light of the illumination element.

In a further embodiment, the door element covers only an ambient illumination portion of the illumination element in the open state. Contrary to this, it is possible for an (interior) room illumination portion of the illumination element to not be covered by the door element in the open state.

In a design variant, the illumination element is arranged in an (e.g. interior) frame or a frame-like (e.g.) interior trim panel of a roof hatch device (which can be open e.g. manually or by a motor). The illumination element therefore does not have to be mounted separately but can be installed in the cab directly during the installation of the roof hatch device.

In a further design variant, the illumination element is arranged in a limb of the frame or the frame-like trim panel, which limb is aligned parallel to a longitudinal roof direction.

In a development, the illumination element is arranged at least partially in a rear corner region of the frame or the frame-like trim panel. Additionally or alternatively, the illumination element is arranged adjacent to a rear limb (e.g. with respect to a longitudinal roof direction) of the frame or the frame-like trim panel, wherein the rear limb is preferably aligned perpendicularly to the longitudinal roof direction. The greatest possible spacing from the storage compartment device can thus be achieved despite the integration in the roof hatch device. This can enable the illumination element to not be covered by the open door element.

In a further exemplary embodiment, a rear limb (e.g. with respect to a longitudinal roof direction) of the frame or the frame-like trim panel has a set-back underside surface, preferably for increasing the headroom for a person sitting below the roof hatch device. The set-back underside surface can preferably be set back in relation to at least an underside surface of the limb aligned parallel to the longitudinal roof direction, preferably by at least 20 mm, particularly preferably by at least 30 mm, e.g. in a range between 30 mm and 40 mm. The set-back underside surface can preferably be set back substantially along an entire length and/or along an entire width of the rear limb. This can enable the device to also be used in the case of comparatively flat roof constructions. The device expediently offers the advantage of increasing the headroom for the person sitting below the rear limb of the frame or the trim panel of the roof hatch device, who typically sits in an elevated position above the engine compartment. The flattening of the rear limb is possible as a result of the integration of the illumination element in the limb of the frame or the trim panel which extends parallel to the longitudinal roof direction. The device can enable that, in case of possible intrusion of the roof in the event of an accident (e.g. simulated by ECE R29-3 Test C), sufficient survival space and headroom can be created for the average passenger sitting in an elevated position. Using simple means, this advantage can be achieved in a cost-neutral manner by a corresponding arrangement of the illumination element without the need for complex reinforcing measures in the roof shell itself, for example.

In an exemplary embodiment, the illumination element is arranged in a rear limb (e.g. with respect to a longitudinal roof direction) of the frame or the frame-like trim panel, which limb is aligned perpendicularly to the longitudinal roof direction. By means of this variant, the greatest possible spacing from the storage compartment device can be achieved so that the illumination element can be prevented from being covered by the open door element. This variant can be used in particular in the case of comparatively high roof constructions.

In a further exemplary embodiment, the device has a further illumination element. The further illumination element can be designed, for example, in the manner of the illumination element described above. The further illumination element can preferably be arranged (e.g. positioned and/or aligned) on the roof liner such that, by means of the further illumination element, the cab interior and the interior of the storage compartment device behind the door element can be illuminated when the door element is completely open. The further illumination element can preferably be arranged in the frame or the frame-like trim panel of the roof hatch device, preferably in a position opposite the illumination element or next to the illumination element.

In an embodiment, the storage compartment device has a middle storage compartment, e.g. with a shelf. The middle storage compartment can preferably be illuminated by the illumination element. The illumination element can preferably be arranged such that an interior of the middle storage compartment can be illuminated below the shelf.

In a development, the middle storage compartment has a storage compartment illumination element with which an interior of the middle storage compartment can be illuminated above the shelf.

In a further embodiment, the middle storage compartment is closable by means of a shutter or is not closable or at least is not closable by means of a door element. It is possible that the illumination element is switched on automatically when the shutter is opened and/or the illumination element is switched off automatically when the shutter is closed.

In a design variant, the storage compartment device has two outer storage compartments (e.g. one on the driver side and one on the passenger side), which can each be closed by a door element. The door elements can be pivoted upwards, e.g. for opening purposes. The door elements can expediently have a height which is smaller than a spacing in a longitudinal roof direction between the illumination element and the door elements in the closed state. By way of example, the illumination element can be arranged in a rear limb of a frame or a frame-like trim panel of a roof hatch device, which limb is aligned perpendicularly to the longitudinal roof direction. The rear limb and/or the illumination element can preferably be arranged at least partially between the door elements in the open state of the door elements. This design variant can be particularly preferably used in the case of high roof constructions with a likewise high storage compartment device.

In another design variant, the storage compartment device has two outer storage compartments (e.g. one on the driver side and one on the passenger side), which can each be closed by a door element. The door elements can be pivoted upwards, e.g. for opening purposes. The door elements can expediently have a height which is smaller than, equal to, or greater than a spacing in a longitudinal roof direction between the illumination element and the door elements in the closed state. By way of example, the illumination element can be arranged in a limb of the frame or the frame-like trim panel, which limb is aligned parallel to a longitudinal roof direction. At least one of the door elements can preferably only cover an ambient illumination portion, and preferably not a room illumination portion, of the illumination element in the open state. Alternatively, it is possible that none of the door elements covers the illumination element in the open state. This design variant can be particularly preferably used in the case of medium-height roof constructions with a likewise medium-height storage compartment device. As a result of not arranging the illumination element in the rear limb, the headroom and the survival space for a passenger sitting in the middle seat below the rear limb, who may be sitting in an elevated position above an engine compartment, can be increased.

The present disclosure also relates to a cab of a utility vehicle, preferably a lorry, having the device for illumination as disclosed herein.

The present disclosure also relates to a utility vehicle, preferably a lorry, having a device as disclosed herein. The utility vehicle can achieve the same advantages as disclosed herein for the device.

The above-described preferred embodiments and features of the present disclosure can be combined with one another in any manner. Further details and advantages of the present disclosure are described below with reference to the accompanying drawings, in which:

The embodiments shown in the figures correspond at least partially to one another, so similar or identical parts are denoted by the same reference signs and reference is also made to the description of the other embodiments or figures for explanation thereof in order to avoid repetition.

FIGS. 1 to 4 show a roof region 10 of a cab (not illustrated in more detail) of a utility vehicle. The utility vehicle is preferably a lorry. A storage compartment device 12 and a roof hatch device 14 are arranged in the roof region 10.

The storage compartment device 12 is arranged on the front side of the cab, above a windscreen. The storage compartment device 12 has, for example, three storage compartments 16, 18 and 20, in particular an outer storage compartment 16 on the driver side, a middle storage compartment 18 and an outer storage compartment 20 on the passenger side. It is, for example, also possible that the storage compartment device 12 has more or fewer storage compartments, which can be arranged above one another and/or next to one another, for example.

The three storage compartments 16, 18, 20 are arranged next to one another. The outer storage compartments 16, 18 can each be closed by means of a door element 22, 24. The door elements 22, 24 can be pivoted upwards for opening purposes. The middle storage compartment 18 is closable by means of a shutter 26, for example. The middle storage compartment 18 is divided into a top region and a bottom region by a shelf 28. The top region can be illuminated by means of a storage compartment illumination element 30.

Figure 1:
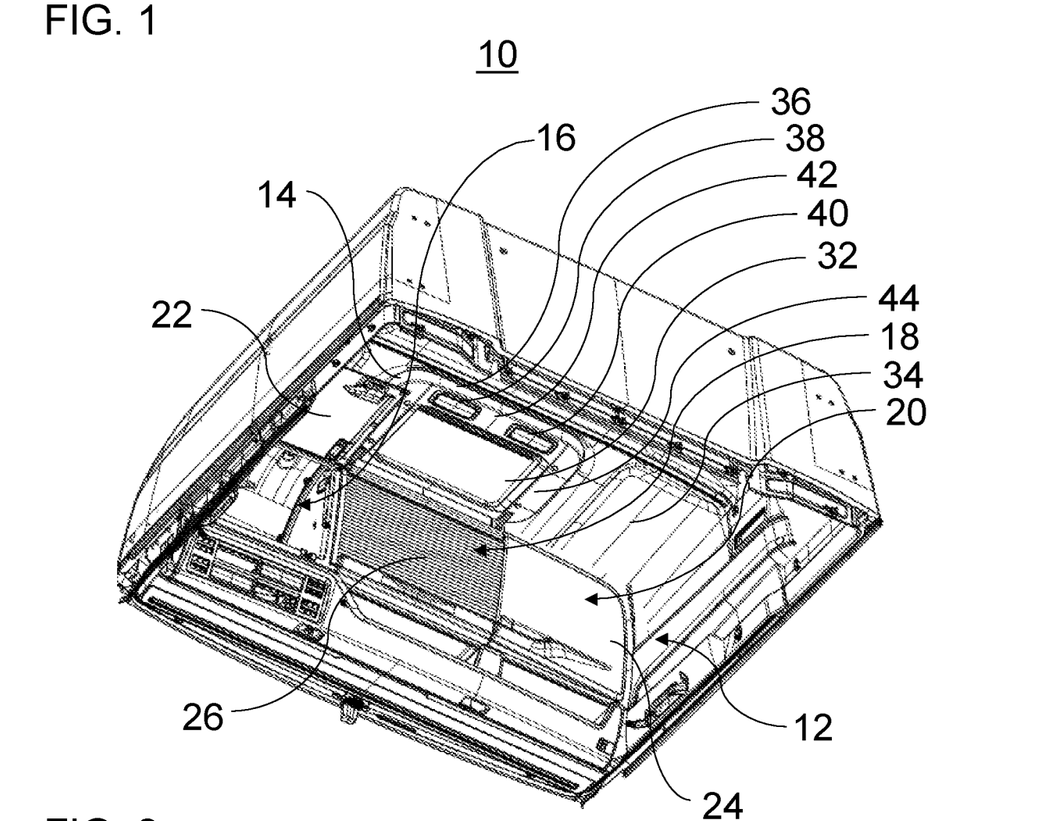
FIG. 1 shows a perspective, angled view from below of a roof region of a cab of a utility vehicle according to an exemplary embodiment of the present disclosure.
Figure 2:
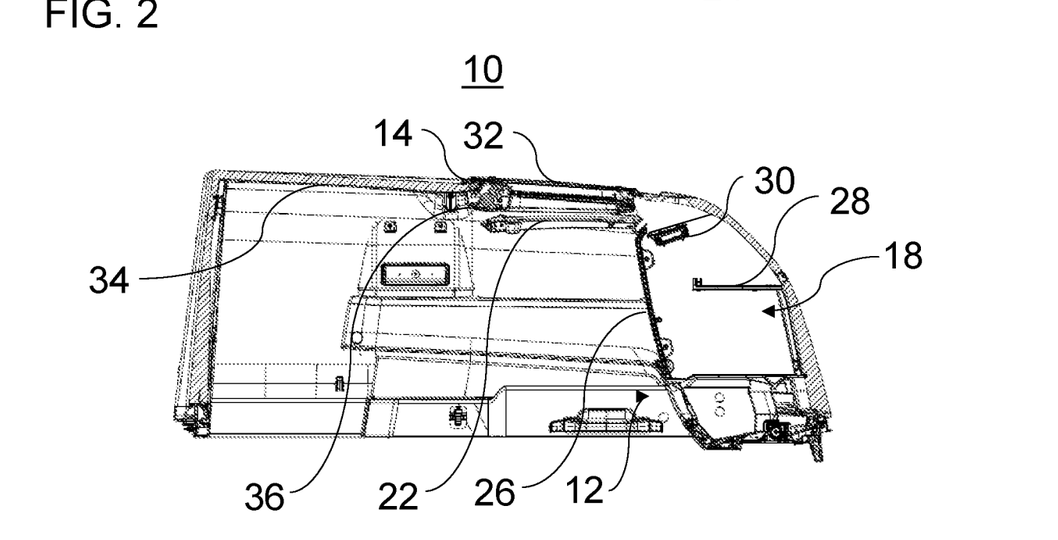
FIG. 2 shows a sectional view through the exemplary roof region of FIG. 1 along a central vertical longitudinal plane of the cab.
Figure 3:
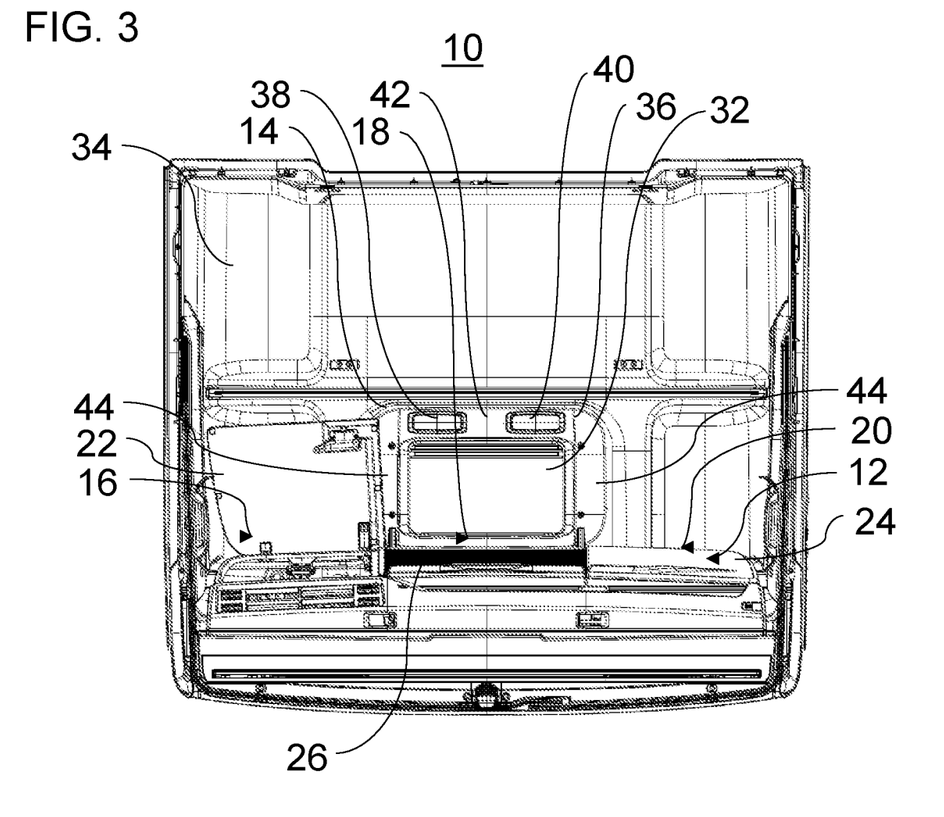
FIG. 3 shows a view from below of the exemplary roof region of FIG. 1.
Figure 4:
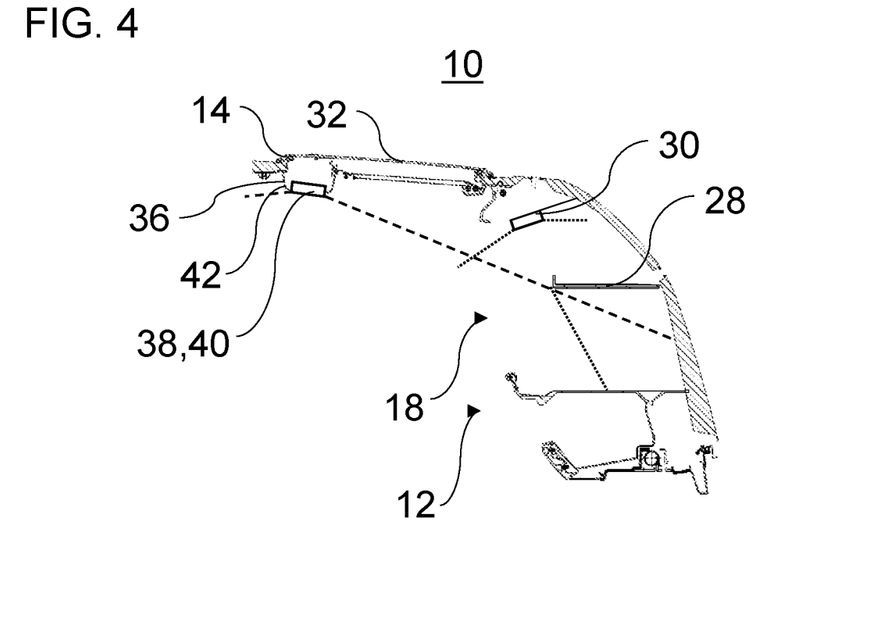
FIG. 4 shows a schematic view of an illumination of the exemplary roof region of FIG. 1.
Figure 5:
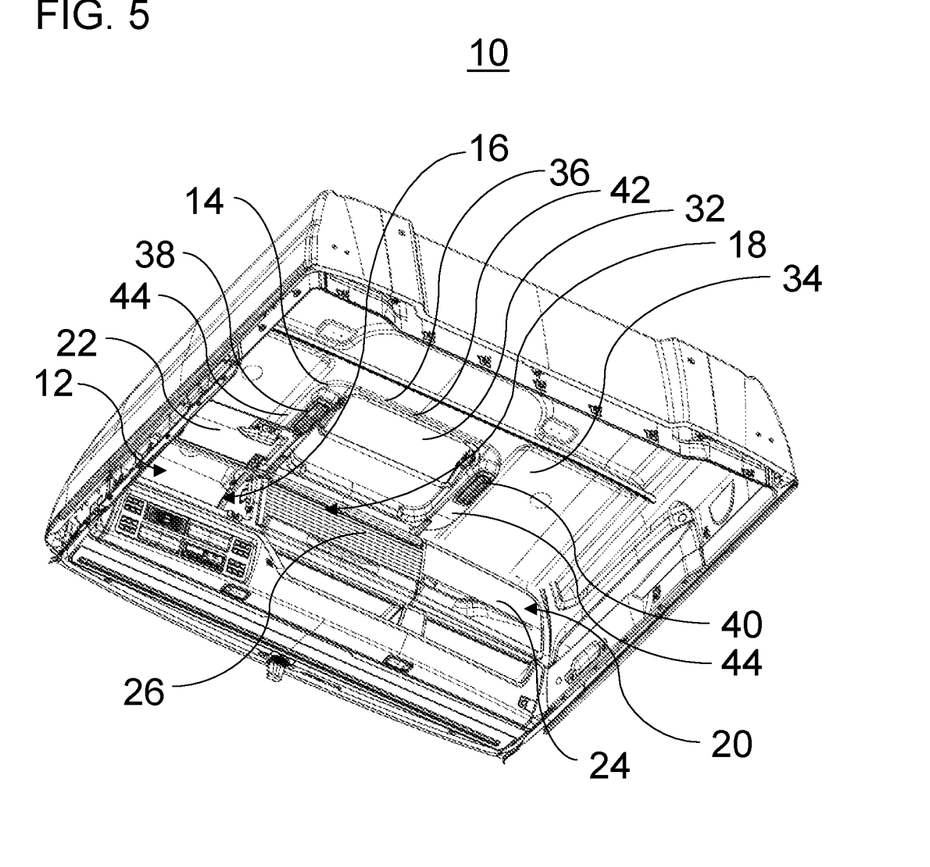
FIG. 5 shows a perspective, angled view from below of a roof region of a cab of a utility vehicle according to a further exemplary embodiment of the present disclosure.

In FIGS. 1 and 3, the door element 22 is open, the shutter 26 is closed and the door element 24 is closed. In FIG. 2, the door element 22 is open and the shutter 26 is closed. In FIG. 4, the shutter 26 is open and is not shown.

The roof hatch device 14 enables aeration and ventilation of the cab. The roof hatch device 14 can be arranged centrally in the roof region 10. The roof hatch device 14 can have an openable roof hatch 32. The roof hatch 32 can be opened, for example, manually or by means of a motor, depending on the design.

The roof hatch device 14 has a frame or a frame-like trim panel 36 in the region of a roof liner 34 of the roof region 10. The trim panel 36 covers the roof hatch device 14 from inside the cab.

The roof hatch device 14 moreover has two illumination elements 38, 40 which can be switched on. The illumination elements 38, 40 are arranged on or in a rear (longitudinal) limb 42 of the trim panel 36. By way of example, the two illumination elements 38, 40 are arranged next to one another and centrally in the limb 42.

The door elements 22, 24 have a height (door element height), which is greater than a spacing along a longitudinal direction of the cab or the roof region 19 between the closed door elements 22, 24 and the two illumination elements 38, 40. The illumination elements 38, 40 are expediently arranged such that they are not covered by the open door elements 22, 24. The illumination elements 38, 40 can be arranged at least partially between the open door elements 22, 24 in the rear limb 42, for example.

On the one hand, this central arrangement of the illumination elements 38, 40 enables the illumination elements 38, 40 to illuminate an interior (driver and passenger area) of the cab. On the other hand, this arrangement moreover enables the illumination elements 38, 40 to additionally illuminate the storage compartments 16, 18, 20 when these are open. The door elements 22, 24 do not cover the illumination elements 38, 40. The illumination elements 38, 40 can be switched on and off manually, for example. If the illumination elements 38, 40 are switched off, they can also be switched on automatically when the door elements 22, 24 are opened and/or they can be switched off, e.g. by means of a contact on the storage compartment device 12, when the door elements 22, 24 are closed.

With respect to the middle storage compartment 18, it is moreover possible to illuminate the bottom region below the shelf 28, which can be only inadequately illuminated by the storage compartment illumination element 30, if at all. For illustrative purposes, in FIG. 4, light beams of the illumination elements 38, 40 are represented by way of example by dashed lines and light beams of the storage compartment illumination element 30 are represented by way of example by dotted lines.

The illumination elements 38, 40 therefore have an integration of functions as interior illumination for the cab on the one hand and as illumination for the storage compartments 16, 18, 20 on the other. It is thus possible to at least partially dispense with separate illumination for the control compartments 16, 18, 20, for example.

It can also be possible that the illumination elements 38, 40 are not arranged in the roof hatch device 14, at least in part, but in another position on the roof liner 34.

The configuration illustrated in FIGS. 1 to 4 can be particularly preferably used when the roof region 10 is comparatively high, as illustrated. The storage compartment device 12 is then typically likewise comparatively high, e.g. in a range between ca. 300 mm and ca. 500 mm. Accordingly, the door elements 22, 24 are also high so that they might cover illumination elements if the illumination elements were arranged in the two transverse limbs of the trim panel 36. The illumination elements 38 and 40 are therefore arranged in the rear (longitudinal) limb 42 of the trim panel 36. Furthermore, the middle storage compartment 18 expediently does not have an upwardly pivotable door element which might cover the illumination elements 38 and 40. Instead, the middle storage compartment 18 is, for example, closable by means of the shutter 26 or, for example, not closable at all.

Another configuration is illustrated in FIGS. 5 to 8. This configuration can in turn be particularly preferably used when the roof region 10 of the cab is medium height, as illustrated. In this case, the storage compartment device 12 on the front side of the cab can likewise be medium height, e.g. in a range between ca. 250 mm and ca. 300 mm.

The door elements 22, 24 of the configuration of FIGS. 5 to 8 are accordingly not as high as the door elements 22, 24 of the configuration of FIGS. 1 to 4. This enables the illumination elements 38, 40 to be arranged in the (transverse) limbs 44 of the frame or the trim panel 36 which extend parallel to the longitudinal cab axis. In detail, the illumination elements 38, 40 are arranged directly adjacent to the rear limb 42. Depending on the design, the door elements 22, 24 do not cover the illumination elements 38, 40 or cover only a short front portion of the illumination elements 38, 40, as illustrated. A (coloured) ambient illumination element portion of the illumination elements 38, 40 is preferably arranged in this front portion of the illumination elements 38, 40. The illumination of the cab interior and the storage compartments 16, 18, 20 is not impaired as a result of the ambient illumination element portion being covered. It is possible that only one of the limbs 42 has an illumination element, for example.

The arrangement of the illumination elements 38, 40 in the limbs 44 can offer a further crucial advantage. In the region of the illumination elements 38, 40, the trim panel 36 for accommodating the illumination elements 38, 40 is enlarged or extended downwards. This enlargement (downward extension) of the trim panel 36 for accommodating the illumination elements 38, 40 expediently does not restrict the headroom for a person sitting below the roof hatch device 14. Nobody is seated directly below the transverse limbs 44. The accommodation of the illumination elements 38, 40 enables the rear (longitudinal) limb 42, below which a person sitting on a middle passenger seat may be located, to be designed such that it is set back or flattened. In detail, an underside surface of the rear limb 42 can be set back in relation to the underside surfaces of the limbs 44, e.g. in a range between 30 mm and 40 mm or more. The underside surface of the rear limb 42 can furthermore be free of raised portions, installations and attachments in order to ensure its flatness. The underside surface of the rear limb 42 can have a flat extent along a total length and width of the rear limb 42. The headroom for the person sitting on the middle passenger seat can thus be increased. This is also relevant insofar as the middle passenger seat is typically arranged in an elevated position since it is arranged on the engine compartment.

The set-back underside surface of the rear limb 42 increases the comfort in normal operation by increasing the headroom. However, in addition, a survival space for a person sitting on the middle passenger seat can advantageously also be increased in certain accident situations, in particular in the event of rollovers.

By way of example, in the case of a predetermined accident situation according to ECE R29-3 (as of May 2019), the roof region 10 can become plastically deformed and pressed in. In the test according to ECE-R29-3 C, a 180° sideways rollover of a lorry is represented in such a way that, by means of a plate, a dynamic lateral cab load (impact) is firstly applied to the e.g. left cab side (or the driver side) at an angle of 20° to the vertical, specifically with a load or an energy of 17.6 kJ. A static load on the pre-crashed cab is then realised via a downward load on the roof in the vertical direction by means of a horizontal plate with a load of 98 kN. Dummies are subsequently placed on the seats of the cab in order to check whether or not they come into contact with a roof liner of the cab.

As a result of the generously dimensioned headroom owing to the set-back underside surface of the rear limb 42, contact between the trim panel 36 and a person can be prevented since an adequate deformation path for the roof region 10 is provided. Therefore, using relatively easily implemented measures, which relate to the dimensioning and design of the trim panel 36 and the arrangement of the illumination elements 38, 40 a sufficiently large survival space can be created for the person on the middle passenger seat. This is achieved without the need for considerably more complex measures relating to additional reinforcement of the roof region 10, for example.

Figure 6:
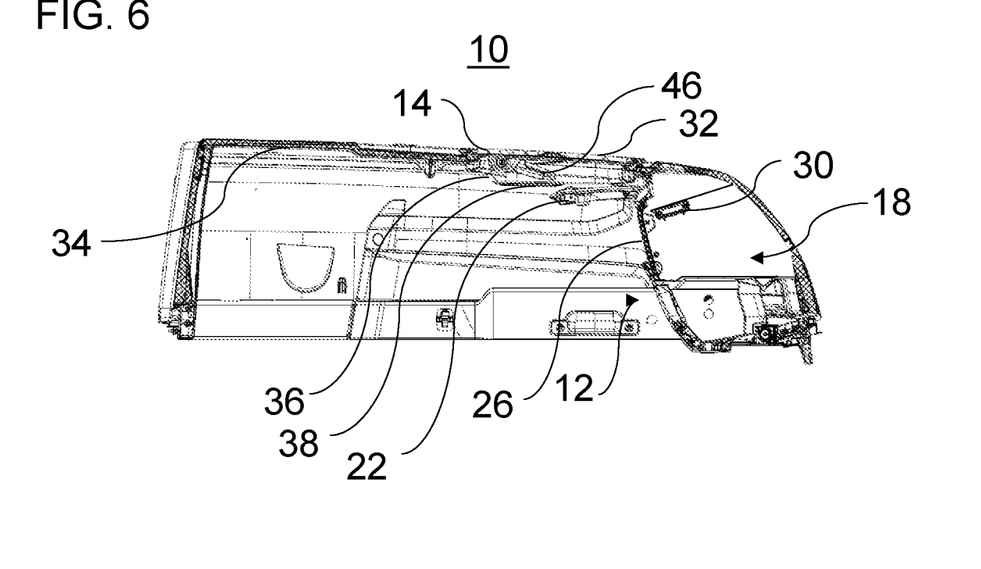
FIG. 6 shows a sectional view through the exemplary roof region of FIG. 5 along a central vertical longitudinal plane of the cab.
Figure 7:
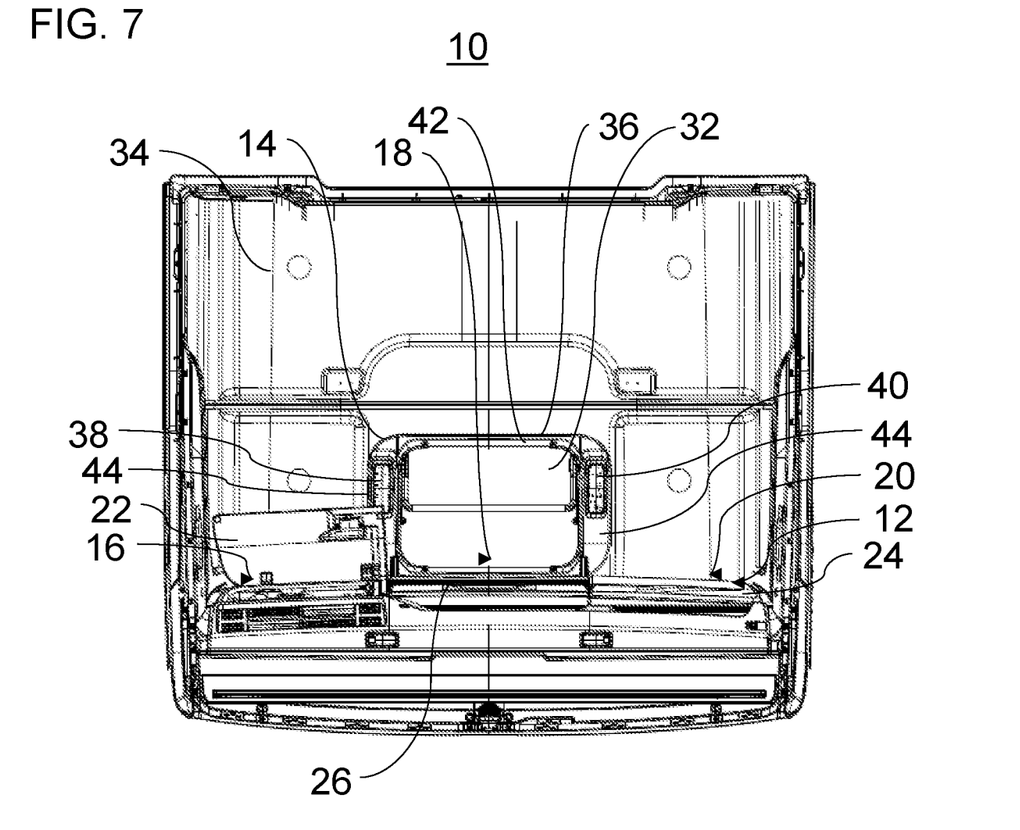
FIG. 7 shows a view from below of the exemplary roof region of FIG. 5.
Figure 8:
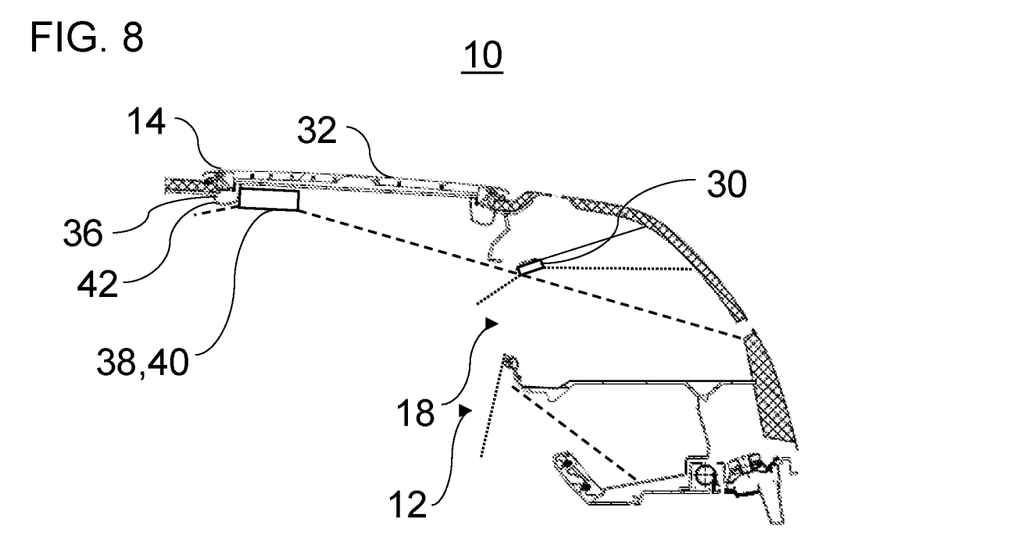
FIG. 8 shows a schematic view of an illumination of the exemplary roof region of FIG. 5.

In this connection, it can moreover be advantageous to position a lever 46 for opening and closing the roof hatch 32 such that it does not project into a region directly below the set-back underside surface of the rear limb 42. By way of example, the lever 46 can expediently be mounted centrally on the roof hatch and can protrude forwards in the forwards direction of travel, as shown in FIG. 6.

On a top surface, the limbs of the trim panel 36 can be shaped such that they form a liquid conduit. The liquid conduit can be shaped, for example, in the form of a channel. The liquid conduit serves to receive liquid, e.g. drops of rain, which enter through the open roof hatch 32. The liquid conduit can conduct the received liquid to a predetermined point. Electrical components (e.g. the illumination elements 38, 40) can thus be protected from contact with liquid which has entered. The person sitting below the roof hatch device 14 can likewise be protected from drops of liquid.

The present disclosure is not restricted to the preferred exemplary embodiments described above. Instead, a plurality of variants and modifications is possible, which likewise make use of the inventive idea and therefore fall within the scope of protection. In particular, the present disclosure also claims protection for the subject matter and the features of the subclaims independently of the referenced claims. In particular, the individual features are each disclosed independently of one another. It should be understood that all range specifications herein are disclosed in such a way that all values falling within the respective range are disclosed individually, so to speak, e.g. also as respectively preferred narrower outer limits of the respective range.

LIST OF REFERENCE SIGNS

10 Roof region
12 Storage compartment device
14 Roof hatch device
16 Outer storage compartment
18 Middle storage compartment
20 Outer storage compartment
22 Door element
24 Door element
26 Shutter
28 Shelf
30 Storage compartment illumination element
32 Roof hatch
34 Roof liner
36 Trim panel
38 Illumination element
40 Illumination element
42 Limb
44 Limb
46 Lever

The invention claimed is:

1. A device for illuminating a cab of a utility vehicle having: a roof region;
a storage compartment device, which is arranged in the roof region and can be closed at least partially by means of a door element; and
an illumination element, which is arranged on a roof liner of the roof region such that, by means of the illumination element, a cab interior and an interior of the storage compartment device behind the door element can be illuminated when the door element is completely open, wherein the illumination element is arranged in a frame or in a frame-like trim panel of a roof hatch device.

2. The device according to claim 1, wherein:
the utility vehicle is a lorry; or
the storage compartment device is arranged in the front roof region and/or on the front side of the cab; or
the door element can be pivoted upwards for opening purposes; or
the illumination element is switched on when the door element is opened or switched off when the door element is closed.

3. The device according to claim 1, wherein:
a spacing in a longitudinal roof direction between the at least one illumination element and the door element is equal to or greater than a height of the door element; or
the door element does not cover the illumination element in the open state.

4. The device according to claim 1, wherein:
the door element covers only an ambient illumination portion of the illumination element in the open state.

5. The device according to claim 1, wherein:
the illumination element is arranged in a limb of the frame or the frame-like trim panel, which limb is aligned parallel to a longitudinal roof direction.

6. The device according to claim 5, wherein:
the illumination element is arranged at least partially in a rear corner region of the frame or the frame-like trim panel; or
the illumination element is arranged adjacent to a rear limb of the frame or the frame-like trim panel, wherein the rear limb is aligned perpendicularly to the longitudinal roof direction.

7. The device according to claim 5, wherein:
a rear limb of the frame or the frame-like trim panel has a set-back underside surface.

8. The device according to claim 7, wherein:
the set-back underside surface is for increasing the headroom for a person sitting below the roof hatch device; or
the set-back underside surface is set back in relation to at least an underside surface of the limb aligned parallel to the longitudinal roof direction; or
the set-back underside surface is set back substantially along an entire length of the rear limb; or
the set-back underside surface is set back substantially along an entire width of the rear limb.

9. The device according to claim 7, wherein:
the set-back underside surface is set back in relation to at least an underside surface of the limb aligned parallel to the longitudinal roof direction by at least 20 mm; or
the set-back underside surface is set back in relation to at least an underside surface of the limb aligned parallel to the longitudinal roof direction by at least 30 mm; or
the set-back underside surface is set back in relation to at least an underside surface of the limb aligned parallel to the longitudinal roof direction in a range between 30 mm and 40 mm.

10. The device according to claim 1, wherein:
the illumination element is arranged in a rear limb of the frame or the frame-like trim panel, which limb is aligned perpendicularly to the longitudinal roof direction.

11. The device according to claim 1, furthermore having:
a further illumination element.

12. The device according to claim 11, wherein:
the further illumination element is arranged on the roof liner such that, by means of the further illumination element, the cab interior and the interior of the storage compartment device behind the door element can be illuminated when the door element is completely open; or
the further illumination element is arranged in the frame or the frame-like trim panel of the roof hatch device.

13. The device according to claim 12, wherein:
the further illumination element is arranged in the frame or the frame-like trim panel of the roof hatch device in a position opposite the illumination element or next to the illumination element.

14. The device according to claim 1, wherein:
the storage compartment device has a middle storage compartment with a shelf; and
the illumination element is arranged such that an interior of the middle storage compartment can be illuminated below the shelf.

15. The device according to claim 14, wherein:
the middle storage compartment has a storage compartment illumination element with which an interior of the middle storage compartment can be illuminated above the shelf; or
the middle storage compartment is closable by means of a shutter or is not closable or is not closable by means of a door element.

16. The device according to claim 1, wherein:
the storage compartment device has two outer storage compartments, which can each be closed by a door element;
the door elements can be pivoted upwards for opening purposes;
the door elements have a height which is smaller than a spacing in a longitudinal roof direction between the illumination element and the door elements in the closed state; and
the illumination element is arranged in a rear limb of a frame or a frame like trim panel of a roof hatch device, which limb is aligned perpendicularly to the longitudinal roof direction.

17. The device according to claim 16, wherein:
the rear limb and/or the illumination element is arranged at least partially between the door elements in the open state of the door elements.

18. The device according to claim 1, wherein:
the storage compartment device has two outer storage compartments, which can each be closed by a door element;
the door elements can be pivoted upwards for opening purposes; and
the illumination element is arranged in a limb of the frame or the frame-like trim panel, which limb is aligned parallel to a longitudinal roof direction.

19. The device according to claim 18, wherein:
one of the door elements covers only an ambient illumination portion of the illumination element in the open state; or
none of the door elements covers the illumination element in the open state.

20. A utility vehicle having a device according to claim 1.
21. The utility vehicle of claim 20, wherein:
the utility vehicle is a lorry.

* * * * *